United States Patent [19]
Blomdahl

[11] Patent Number: 5,909,208
[45] Date of Patent: Jun. 1, 1999

[54] CONTROL MEANS FOR COMPUTERS OR INDUSTRIAL PROCESSES

[76] Inventor: Rolf Blomdahl, Skridskogatan 26 SE-731 52, Köping, Sweden

[21] Appl. No.: 08/765,668
[22] PCT Filed: Jul. 3, 1995
[86] PCT No.: PCT/SE95/00814
§ 371 Date: Dec. 6, 1996
§ 102(e) Date: Dec. 6, 1996
[87] PCT Pub. No.: WO96/01448
PCT Pub. Date: Jan. 18, 1996

[30] Foreign Application Priority Data

Jul. 6, 1994 [SE] Sweden ................................. 9402388

[51] Int. Cl.[6] ...................................................... G09G 5/00
[52] U.S. Cl. ............................................ 345/156; 345/157
[58] Field of Search ................................... 345/156, 157, 345/158; 273/148 B

[56] References Cited

U.S. PATENT DOCUMENTS

| | | | |
|---|---|---|---|
| 5,311,210 | 5/1994 | O'Brien et al. ........................ | 345/168 |
| 5,440,326 | 8/1995 | Quinn ..................................... | 345/157 |
| 5,515,078 | 5/1996 | Greschler et al. ..................... | 345/156 |

OTHER PUBLICATIONS

Leonard, Computer Pointer Controls 3D Images In Free Space, Electronic Design Nov. 21, 1991, pp. 160, 162, 165.

*Primary Examiner*—Matthew Luu
*Attorney, Agent, or Firm*—Pollock, Vande Sande & Priddy

[57] ABSTRACT

A control device for computers or industrial processes is provided. The device comprises one or more transducers arranged in a chair for sensing movements of the chair. A first transducer is arranged to sense turning movements of the chair and emit signals corresponding to movements in a horizontal direction. A second transducer is provided for sensing tilting movements of the chair and is arranged to emit signals corresponding to movements in a vertical direction. The output signals of the first and second transducers are supplied to an interface. The interface outputs signals to a transmitter which controls the computer or process, for example, a cursor on a display device.

9 Claims, 2 Drawing Sheets

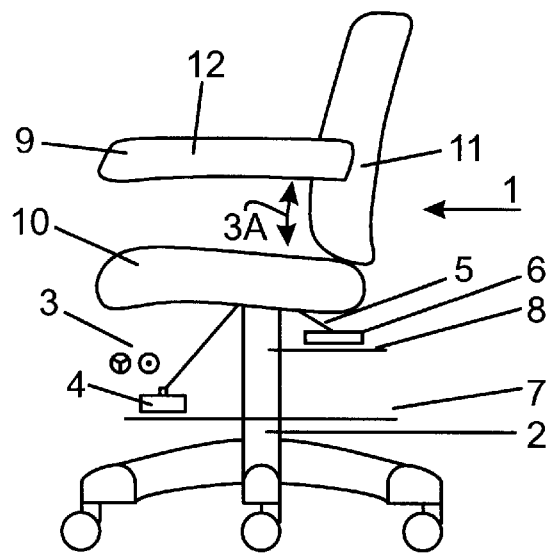
Fig. 1
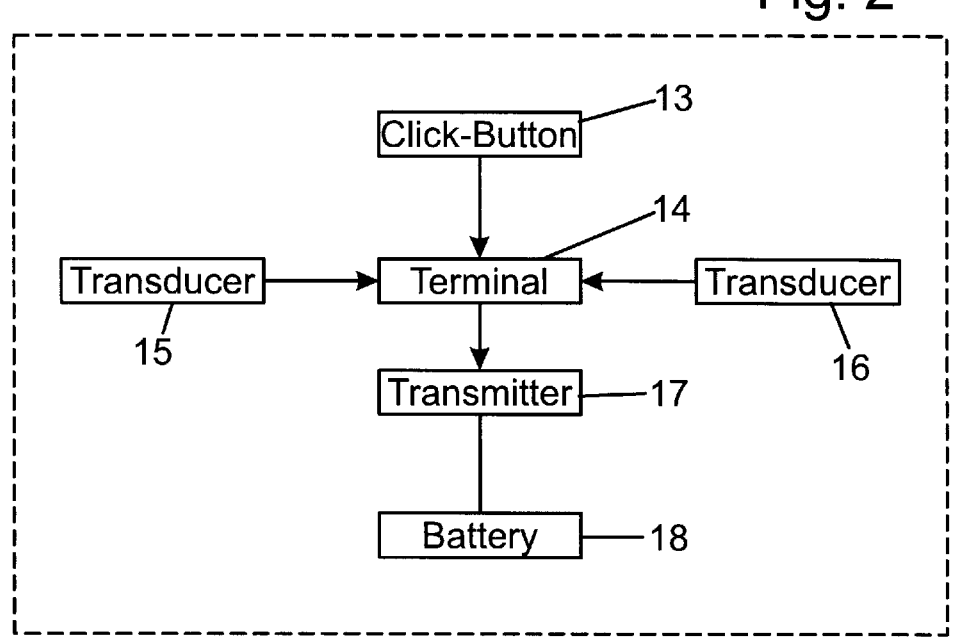
Fig. 2
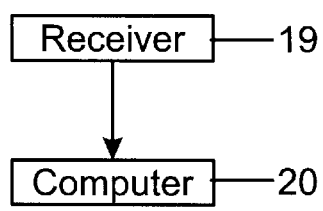

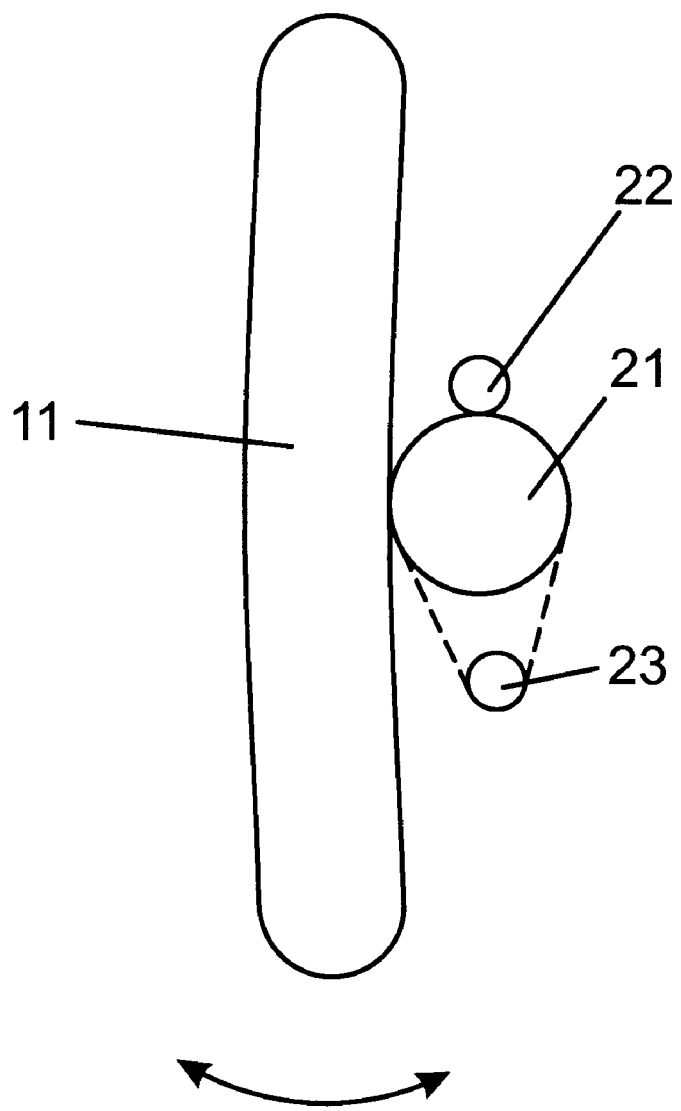

CONTROL MEANS FOR COMPUTERS OR INDUSTRIAL PROCESSES

TECHNICAL FIELD

The present invention relates to a control device for computers, industrial processes and the like, intended to replace the conventional mouse or positioner for a computer.

BACKGROUND ART

The mouse has become a necessity when using most modern computer programs. Software using windows has been developed in recent years and has become very user-friendly. The computer is given instructions by pointing and clicking with the mouse. However, certain drawbacks have resulted. Unfavourable strain is caused on the arm, shoulder and neck when using the mouse, and gives rise to "mouse arm"0 which is currently a big problem.

Some 40–50 million personal computers are sold annually, for instance. Windows is often installed as standard equipment and a mouse is included in the delivery. "Mouse disease" or RSI (Repetitive Stress Injury) costs the United States approximately seven billion dollars a year in treatment and lost production.

Efforts have been made to solve these problems in various ways, such as by providing support for the hand and/or arm, by means of a foot operated mouse, a trackball or by means of software that forces the user to take a break. However, these methods offer only a slightly reduced risk of injury and therefore do not solve the problem. The injurious static load remains.

SUMMARY OF THE INVENTION

The invention aims at a solution to these and other associated problems It is characterized in that one or more transducers are arranged in a chair or the like, the transducer signals being transmitted to a computer, process, etc. which is thus controlled. A transducer or gyro(s) is suitably arranged in a chair in order to sense turning movements of the chair and to emit signals corresponding to movements in horizontal direction, and also a transducer or gyro(s) is also provide for sensing tilting or other similar movements of the chair, such as movements in the vertical direction. The output signals of these transducers are to be combined in an interface, the output signals of which are supplied to a transmitter which controls the computer, industrial process, etc., such as the cursor on a display device. The conventional mouse is thus entirely or partially replaced by the movements of the chair. One or more gyros, intended to be covered by the term "transducer", may also be used as transducer.

The new concept is based on the principle of controlling the computer by means of the entire body via the chair. The transducers in the chair sense the movements of the body. When the body is turned, for instance, the chair follows the movement and the transducer activates the cursor on the display device so that it moves horizontally. When the body is moved forward or backwards, the other transducer in the back-rest or seat is activated and the cursor moves in vertical direction.

The transducers can easily be constructed as a pair of mice, one producing horizontal and the other vertical movement. An advantage of this distribution is that, besides different movements being registered, the control can be varied between 0 and 100% by turning the mouse between 90 and 0 degrees (the rotation of the ball is measured in two directions perpendicular to each other). Other alternatives are load cells, strain gauges, etc. It is also possible to use only a part of the mouse—only the ball with its transducer, for instance. Other types of transducers may be used, such as pointers used in industry. The same sort of signals can be generated if instead the transducer is fixed and the counter surface moves. Movements other than the rocking and turning movements described above can be used, such as rocking the whole chair, rocking sideways, tilting the arm-rest or moving the chair on its wheels, etc.

More than two movements can be used simultaneously, for instance, control in three dimensions (x, y and z direction). Also, a stool or an armchair, for instance, may be used instead of a chair, or the user can stand and lean against a control device.

In a preferred embodiment of the invention microswitches, "click-buttons", or the like, are also arranged on the chair, for instance on an arm-rest, intended for mouse clicking. These may also be located at the feet of the chair or in the keyboard. Yet another alternative is to define a combination of pressing keys and mouse clicking in a program. Radio-controlled mice are commercially available and radio control may be used to eliminate the need for cables between the chair and computer. However, cable connection to the computer is also possible. IR, laser, microwave or other electromagnetic wave motion can be utilized. IR-controlled mice are also available and may be used.

BRIEF DESCRIPTION OF THE DRAWINGS

The invention is exemplified in the accompanying drawings in which

FIG. 1 illustrates a chair according to the invention;

FIG. 2 is a diagrammatic sketch of the inventive concept; and

FIG. 3 shows a detail of an alternative embodiment.

PREFERRED EMBODIMENT

FIG. 1 shows a chair (1) equipped in accordance with the invention. The chair can be turned about a support (2) and this movement is arranged to be sensed by a transducer (4) arranged by the chair. The transducer rotates on or in the vicinity of a fixed horizontal plate (7) as shown by the arrow (3). The output signals from this transducer (4) sensing the turning movement of the chair, emit impulses to a cursor for horizontal movement, as described in more detail below.

A link system (5) is connected to the seat (10) or back-rest (11) of the chair, and also to a second transducer (6) designed, when the chair is tilted forwards or backwards (see the arrow 3 A), to move along a plate (8) thereby indicating tilting movements of the chair. Both transducers (6 and 4) may be of conventional mouse type and sensing may be effected by means of a ball moving along the contact surfaces (7 and 8, respectively). The second transducer (6) emits impulses for vertical movement, as described in more detail below.

A microswitch (9), a "click-button" or the like, designed for mouse clicking is arranged on the arm-rest (12). These can of course be arranged at other parts of the chair, or on or beside the keyboard.

FIG. 2 shows a diagrammatic sketch of the invention. The click-buttons are shown at (13), their output signals being supplied to a terminal block (14). The transducers for the turning and tilting movements of the chair are shown at (15) and (16), respectively, and their output signals are also supplied to the terminal block (14). The output signals from the latter are supplied to a transmitter (17), to which a battery (18) is also connected. The output signals from the transmitter (17) thus correspond to the output signals from a conventional mouse, and are suitably supplied by radio control to a receiver (19) by the computer (20). The output signals from the transducers (15, 16) thus correspond to the horizontal or vertical movement of the cursor on the screen.

FIG. 3 shows sensing of the movements of the chair via the back-rest. The movements are indicated by the double arrow. A tube (21) is attached to the back-rest (11). The rotating tube (21) is connected to the mouse ball (22) which thus indicates the movements of the back-rest. An alternative is shown in broken lines in FIG. 3, a belt or the like actuates a small wheel (23) or the equivalent on the axis normally driven by the mouse ball.

Instead of being used to control a computer, the inventive concept may be applied to controlling an industrial process and, as previously mentioned, the type of transducer may vary. The interface may be built into the transmitter. A transmitter may also be provided for each transducer. Batteries may be connected to the terminal instead of to the transmitter.

The ergonometric aspects of the invention may be summarized as follows:

The body movements can be followed visually.

The cursor is under observation while the hands are free.

Body balance is used for control.

Less point loading is obtained on the body.

Static torque on the arm is removed.

No more static load is caused than that caused by sitting.

Other advantages are that the computer table can be designed solely taking into consideration the requirements of the keyboard.

The following advantages are also applicable, particularly in the case of gyros:

Small dimensions and low weight.

Only one transducer is required since this senses movements in different directions.

The gyro can easily be fitted on a suitable part of the chair, e.g. the backrest or seat.

The possibility of manufacturing an accessory for chairs increases. It would be possible to develop an arm-rest with built-in click-buttons, transmitters, interface, batteries, with a cable to the transducer, for instance, the latter suitably being secured to the back-rest. It is possible to manufacture a complete unit comprising control equipment as an accessory to existing chairs.

The invention can also be used for controlling handicap aids. With a light source having a directed beam fitted on the chair, photocells can be used to actuate the various operating means. Not only computers can be controlled by means of the invention, in an industrial process, for instance, one movement could control the fuel supply and another the air supply in a combustion process.

The invention can be varied in many ways without departing from the scope of the invention as defined in the appended claims.

I claim:

1. A control device for computers or industrial processes, said device comprising: a plurality of transducers or gyros arranged in a chair for sensing movements of the chair said transducers comprising a first transducer for sensing turning movements of the chair and arranged to emit signals corresponding to movements in a horizontal direction, and a second transducer for sensing tilting movements of the chair and arranged to emit signals corresponding to movements in a vertical direction, output signals of said first and second transducers being supplied to an interface output signals of said interface being supplied to a transmitter which controls the computers or process.

2. A control device according to claim 1, wherein microswitches or click-buttons, are also arranged an arm-rest of the chair for mouse clicking.

3. A control device according to claim 1, wherein said first and second transducers are arranged to sense movements of the chair at right angles in relation to each other, the first transducer sensing movements in said horizontal or X-direction and the second transducer sensing movements in said vertical or Y-direction in a right-angled coordinate system.

4. A control device according to claim 1, wherein the movements of the chair are arranged to be sensed by a rotating ball, load cells, strain gauge, photocells, or gyro.

5. A control device according to claim 1, wherein the turning movements of the chair are sensed by said first transducer running towards or close to a horizontal plate.

6. A control device according to claim 1, wherein the tilting movements of the chair are sensed by a link system connected to a seat or back-rest of the chair and influence the second transducer for movements along a horizontal plate.

7. A control device according to claim 1, wherein the transmitter transmits signals by cable or without wires to a receiver connected to the computer or built into said computer.

8. A control device according to claim 1, wherein movements of the chair in more than two dimensions are sensed for control in x, y or z directions.

9. A control device according to claim 1, wherein said output signals control a cursor on a display device.

* * * * *